United States Patent [19]

Kawanabe et al.

[11] Patent Number: 4,868,756
[45] Date of Patent: Sep. 19, 1989

[54] METHOD OF INDICATING A SHIFT OPERATION OF A MANUAL TRANSMISSION GEAR OF A VEHICLE

[75] Inventors: Tomohiko Kawanabe; Masahiko Asakura; Katsuhiko Kimura; Yasunari Seki; Kouji Matsuura; Hiroshi Hasebe, all of Wako, Japan

[73] Assignee: Honda Giken Kogyo Kabushiki Kaisha, Tokyo, Japan

[21] Appl. No.: 12,319

[22] Filed: Feb. 9, 1987

[30] Foreign Application Priority Data

Aug. 9, 1985 [JP] Japan .................................. 60-175171
Aug. 9, 1985 [JP] Japan .................................. 60-175175

[51] Int. Cl.⁴ ...................... B60K 41/06; G09B 19/16; G07C 5/08
[52] U.S. Cl. .................................. 364/442; 340/439; 340/456; 364/424.1
[58] Field of Search ................. 364/421.1, 431.1, 442; 434/71; 74/868, 766; 192/3.31; 340/52 D

[56] References Cited

U.S. PATENT DOCUMENTS

| | | | |
|---|---|---|---|
| 4,439,158 | 3/1984 | Weber | 434/71 |
| 4,449,618 | 5/1984 | Suga et al. | 192/82 |
| 4,531,432 | 7/1985 | Inagaki et al. | 75/866 |
| 4,550,596 | 11/1985 | Ueda | 364/424.1 |
| 4,555,691 | 11/1985 | Hosaka et al. | 434/71 |
| 4,622,637 | 11/1986 | Tomita et al. | 364/442 |
| 4,643,049 | 2/1987 | Nishikawa et al. | 74/868 |
| 4,688,530 | 8/1987 | Nishikawa et al. | 62/133 |
| 4,723,215 | 2/1988 | Hibino et al. | 364/442 |
| 4,752,883 | 6/1988 | Asakura et al. | 364/421.1 |
| 4,762,026 | 8/1988 | Kinugasa et al. | 74/866 |

Primary Examiner—Felix D. Gruber
Attorney, Agent, or Firm—Birch, Stewart, Kolasch & Birch

[57] ABSTRACT

A method for indicating a shift operation for a manual transmission gear includes a step for comparing a detected vehicle speed with a reference speed which is determined and changed on the basis of a detected engine temperature and a step for indicating the shift operation on this basis of a result of the comparison. When a temperature parameter relating to the engine operation is lower than a predetermined reference temperature value, the reference vehicle speed is raised so that the indication of the shift operation will not be generated.

2 Claims, 9 Drawing Sheets

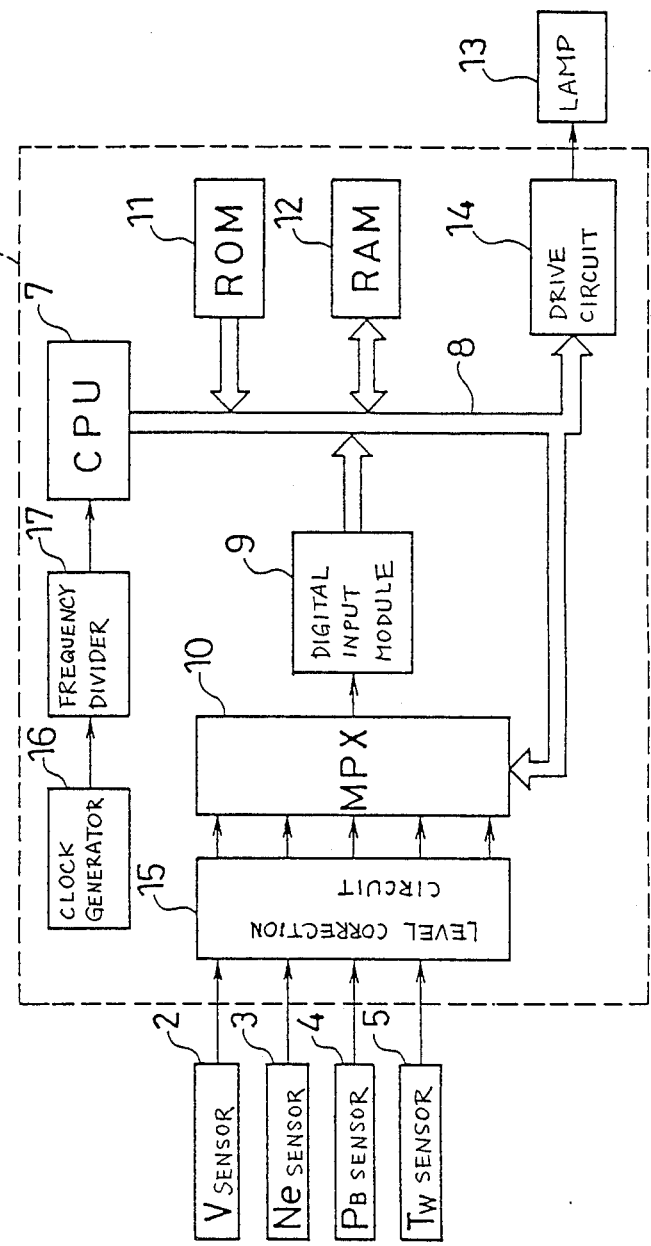

Fig. 2A
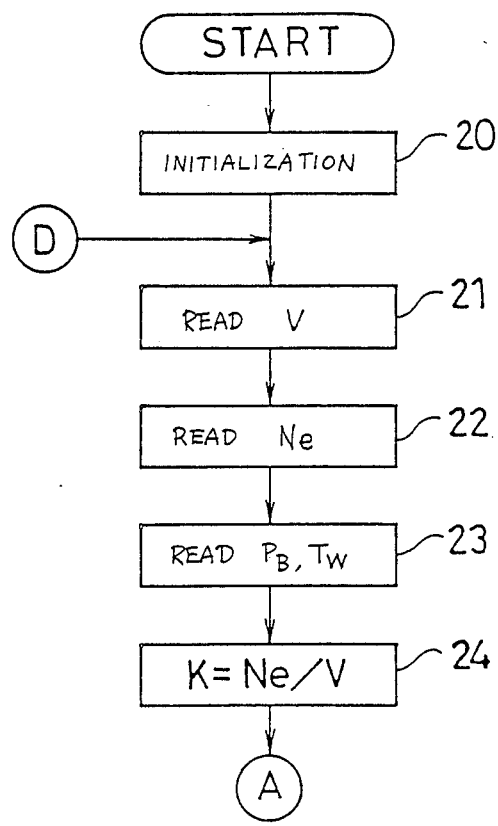
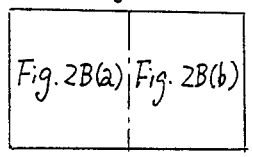
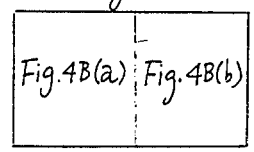

METHOD OF INDICATING A SHIFT OPERATION OF A MANUAL TRANSMISSION GEAR OF A VEHICLE

BACKGROUND OF THE INVENTION

1. Field of the Invention

The present invention relates to a method of indicating a shift operation for a manual transmission gear, and more particularly, to a method which senses a state of the vehicle operation (including the engine operation) requiring a shift operation for the transmission gear and indicates the necessity of the shift operation for the transmission gear.

2. Description of Background Information

By suitably selecting the gear position of a manual transmission gear of a vehicle in accordance with a parameter of the vehicle operation such as the load applied to the vehicle, the fuel consumption in a preselected running mode of the vehicle, as well as in the actual running condition after the vehicle is brought into the market, can be improved. Conventionally, various methods for indicating a desirable gear position have been proposed. For example, Japanese patent application Laid Open Number 55-31671 discloses a method in which the rotational speed of the engine and the throttle position are monitored, and the vehicle operation requiring an up-shift operation or a down-shift operation is indicated according to the monitored rotational speed of the engine and the throttle position. Japanese patent application Laid Open No. 56-163929 discloses a method in which the temperature of the engine oil and the temperature of the intake air are detected, and a range of economical fuel consumption is displayed in accordance with a result of the detection.

On the other hand, when the temperature of the engine is low, such as in the engine start period which is a state of a very low engine temperature where a sufficient engine warming characteristic is required, it is difficult to obtain sufficient engine power because the atomization of fuel is insufficient when the engine temperature is low, as compared with a state of a medium engine temperature, and the loss of the engine power increases due to the viscosity of the engine oil.

Therefore, if a reference level of the determination, such as an up-shift, for the indication of the shift operation for the manual transmission gear is selected to be the same for both of the low temperature range and the medium temperature range, driveability of the vehicle will be worsened in the low temperature range, and the warming-up of the engine will be delayed because the heat generated by the engine is little.

OBJECTIVE AND SUMMARY OF THE INVENTION

An objective of the present invention is therefore to provide a method for indicating a shift operation of a manual transmission gear, by which the driveability of the vehicle is enhanced when the temperature of the engine is low, and the warming-up characteristic of the engine is improved.

According to the present invention, a method for indicating a shift operation of a manual transmission gear comprises a step for detecting a vehicle speed and the temperature of the engine mounted on the vehicle, a step for determining a reference vehicle speed in such a manner that the reference vehicle speed is set, when the detected temperature of the engine is lower than a first reference engine temperature to be higher than a value determined for each gear shift position in which the detected temperature of the engine is higher than the first reference engine temperature, a step for indicating the shift operation on the basis of a result of a comparison between the detected vehicle speed and the reference vehicle speed, and a step for raising the reference vehicle speed when the detected temperature of the engine is lower than a second reference engine temperature which is set to be lower than the first reference engine temperature.

According to another aspect of the invention, a method for indicating a shift operation of a manual transmission gear comprises a step for detecting a vehicle speed and the temperature of the engine mounted on the vehicle, a step for determining a reference vehicle speed in such a manner that the reference vehicle speed is set when the detected temperature of the engine is lower than a reference engine temperature, to be higher than a value determined for each gear shift position in which the detected temperature of the engine is higher than the reference engine temperature, a step for indicating the shift operation on the basis of a result of a comparison between the detected vehicle speed and the reference vehicle speed, a step for detecting an intake air temperature of the engine, and a step for raising the reference vehicle speed when the detected intake air temperature is lower than a reference intake air temperature which is set to be lower than the first reference engine temperature.

BRIEF DESCRIPTION OF THE DRAWINGS

FIG. 1 is a block diagram showing the construction of a control system in which the indication method according to the present invention is adopted;

FIG. 2B is a diagram illustrating the juxtaposition of FIGS. 2B(a) and 2B(b);

FIG. 4B is a diagram illustrating the juxtaposition of FIGS. 4B(a) and 4B(b).

DETAILED DESCRIPTION OF THE PREFERRED EMBODIMENTS

Figure 2B:
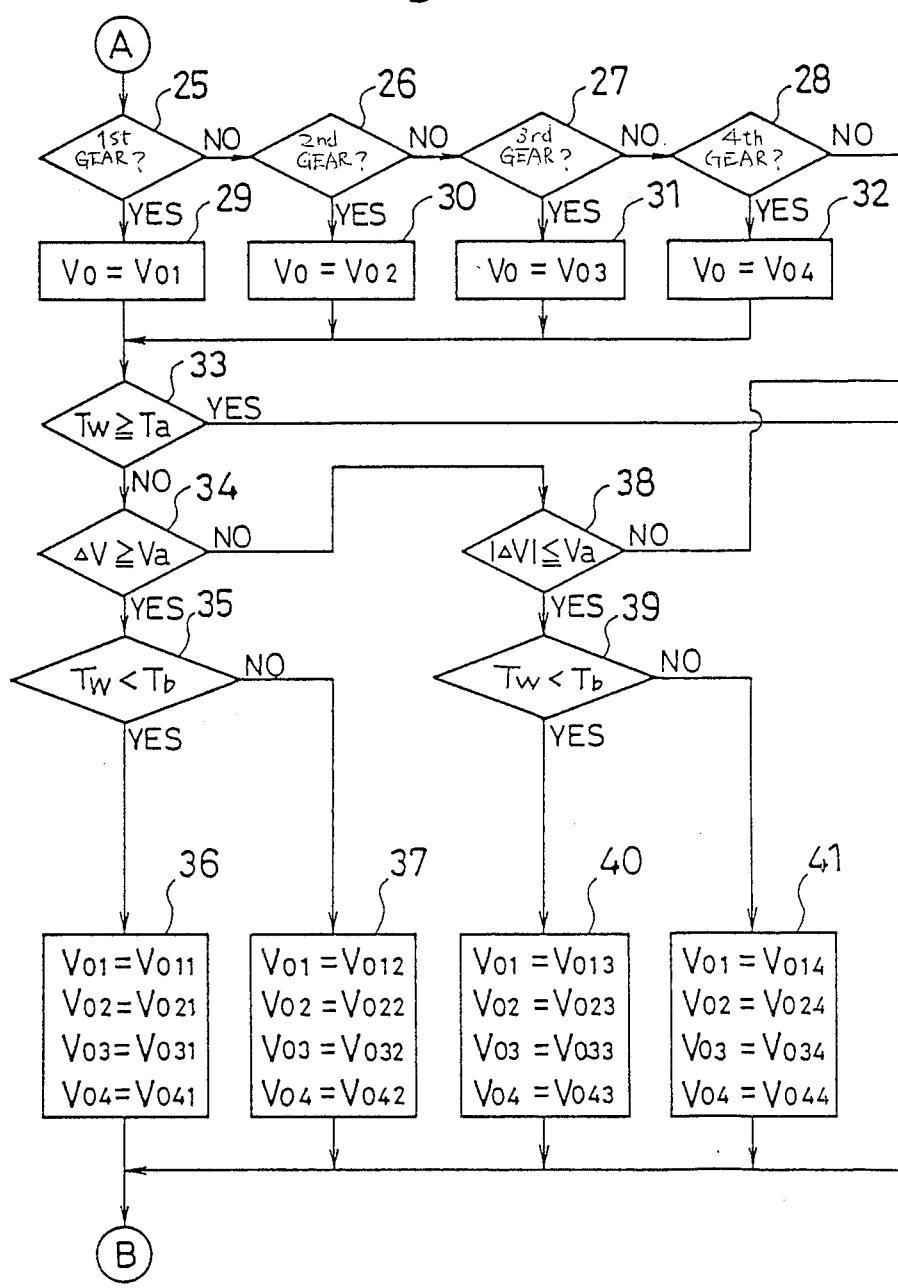
FIGS. 2A, 2B(a), 2B(b) and 2C are flowcharts illustrating steps of the shift operation indication method of the present invention in which the jump point A of FIG. 2A connects to the point A of FIG. 2B(a), the jump point B of FIG. 2B(a) and the jump point C of FIG. 2B(b) connect to points B and C of FIG. 2C, and the jump point D of FIG. 2C connects to point D of FIG. 2A.
Figure 2B:
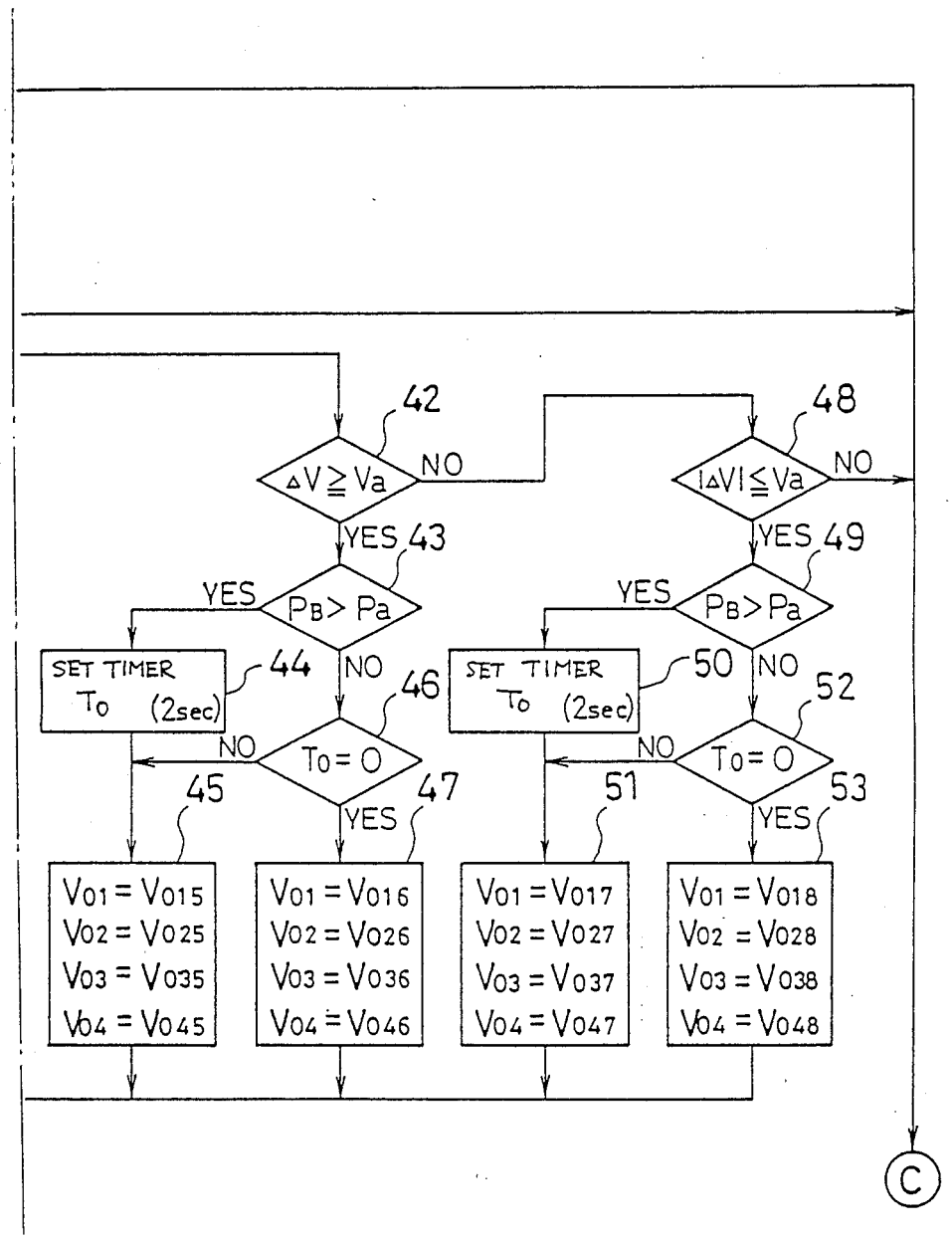

A first embodiment of the shift operation indication method according to the present invention will be explained with reference to FIG. 1 of the accompanying drawings showing the control system in which the shift operation indication method of the present invention is embodied.

As shown, the control system includes a control circuit 1 which comprises a microcomputer. The control circuit 1 is supplied with output signals from various sensors such as a vehicle speed sensor 2, an engine rotational speed sensor 3, vacuum sensor 4, and a cooling water temperature sensor 5. The vehicle speed sensor 2 produces the output signal in the form of a pulse train whose frequency is corresponding to the vehicle speed V. The vehicle speed sensor 2 for example consists of a reed switch provided in a speedometer (not shown), and which generates four pulses for every one revolution of a speedometer cable. The engine rotational speed sensor 3 generates, for example, a pulse train whose frequency corresponds to the engine rotational speed Ne, in synchronism with the ignition timing of the engine. The vacuum sensor 4 generates an analog output signal whose level corresponds to a vacuum $P_B$ in an intake pipe of the internal combustion engine (not shown), on the downstream side of the throttle valve. The cooling water temperature sensor 5 generates an analog output signal whose level corresponds to the temperature of the cooling water of the engine.

The control circuit 1 has a CPU 7 (central processing unit) which performs digital calculation operations. The CPU 7 is provided with an input/output bus 8 through which data signals and address signals are inputed or outputed to the CPU 7. The input/output bus 8, is connected to a digital input module 9, an MPX (multiplexer) 10, a ROM (read only memory) 11, a RAM (random access memory) 12, and a drive circuit 14 for driving an indication lamp 13 which indicates an up-shift operation of the transmission gear. The MPX 10 is a switch for selectively transmitting one of the output signals from sensors 2–5 supplied from a level correction circuit 15 to the digital input module 9 in accordance with a command from the CPU 7. The CPU 7 is connected to a frequency divider 17 for supplying a clock pulse signal from a clock generator 16. Further, a timer $T_0$ is incorporated in the CPU 7. This timer $T_0$ is designed as a downcounter which starts the down-counting operation every time it is set.

With this construction, the control circuit 1 performs a control operation in which the operational state of the vehicle is determined from the output signals from the sensors 2–5 and the necessity of the up-shift operation of the manual transmission is indicated to a driver of the vehicle, by driving the lamp 13, in accordance with a program which will be described below.

The steps of the shift operation indication method according to the present invention, which are performed by the control circuit 1, will be explained with reference to operational flowcharts of FIG. 2A through FIG. 2C.

As shown in FIG. 2A, an initialization process is executed at a step 20. After the initialization process, the program starts repeatedly at predetermined intervals (every 20 m sec, for example) and the vehicle speed V stored in the RAM 12 is read out at a step 21. Subsequently, the engine rotational speed Ne which has been stored in the RAM 12 in a similar manner, is read out at a step 22. The vehicle speed V and the engine rotational speed Ne are stored in the RAM 12 in the following manner. Specifically, the pulse signal from the vehicle speed sensor 2 is supplied to the CPU 7 also as an interruption signal. Each time the application of the interruption signal is supplied, the CPU 7 measures an interval between the present pulse signal and a preceding pulse signal. The CPU 7 then calculates an average value of a predetermined number (for example, four, corresponding to one revolution of a speedometer cable) of the measured intervals, and stores the calculated average value in the RAM 12. The pulse signal of the rotational speed (Ne) sensor 3 is also supplied to the CPU 7 as an interruption signal, and an average value of the rotational speed is stored in the RAM 12 in a manner similar to the processing of the output signal from the vehicle speed sensor 2. Subsequently, the CPU 7 performs the reading of the analog output signals of the $P_B$ sensor 4 and the $T_W$ sensor 5 at a step 23, and a calculation of the gear position K (K=Ne/V) at a step 24, at intervals (for example, 400 m sec) longer than the interval of the starting of the program.

Subsequently, as shown in FIG. 2B, the present gear position is detected by determining whether or not the value K is in a predetermined range at steps 25 through 28, and a reference vehicle speed value $V_0$ ($V_{01}$ through $V_{04}$) is set for each of the gear positions, at steps 29 through 32, such that the values $V_{01}$ through $V_{04}$ are set for the first through fourth gears, respectively, as the reference speed value $V_0$. Then, the CPU determines whether or not the engine cooling water temperature $T_W$ is equal to or higher than a predetermined first reference temperature level Ta (75° C, for example) is detected at a step 33. If $T_W \geq Ta$, an operation that is called a HOT mode will be selected and if $T_W < Ta$, an operation that is called a COLD mode will be selected.

In the operation of the COLD mode ($T_W < Ta$), the CPU determines whether or not the a difference $\Delta V$ between the present value of the vehicle speed V and a preceding value of the vehicle speed V, is greater than or equal to a predetermined value Va (0.5 mile/h) at a step 34. If $\Delta V \geq Va$, the vehicle is accelerating, and the CPU determines whether or not the cooling water temperature $T_W$ is lower than a predetermined second reference temperature Tb (40° C, for example) at a step 35. If $T_W < Tb$, data values $V_{011}$, $V_{021}$, $V_{031}$, and $V_{041}$ are in turn set at a step 36, as the reference vehicle speed values $V_{01}$ through $V_{04}$. On the other hand, if $T_W \geq Tb$, data values $V_{012}$, $V_{022}$, $V_{032}$, and $V_{042}$ are in turn set at a step 37, as the reference vehicle speed values $V_{01}$ through $V_{04}$. In addition, the data values $V_{011}$, $V_{021}$, $V_{031}$, and $V_{041}$ used at the step 36 are set to be higher than the data values $V_{012}$, $V_{022}$, $V_{032}$, and $V_{042}$ used at the step 37 respectively.

On the other hand, if it is detected that $\Delta V$ is smaller than the predetermined value Va ($\Delta V < Va$) at the step 34, the CPU determines whether or not an absolute value $|\Delta V|$ is equal to or smaller than the predetermined value Va, at a step 38. If $|\Delta V| \geq Va$, the vehicle is cruising, and the CPU determines whether or not the cooling water temperature $T_W$ is lower than the second predetermined reference temperature value Tb at a step 39. If $T_W < Tb$, data values $V_{013}$, $V_{023}$, $V_{033}$, and $V_{043}$ are in turn set at a step 40, as the reference vehicle speed values $V_{01}$ through $V_{04}$. On the other hand, if $T_W \geq Tb$, data values $V_{014}$, $V_{024}$, $V_{034}$, and $V_{044}$ are in turn set at a step 41, as the reference vehicle speed values $V_{01}$ through $V_{04}$. In addition, the data values $V_{013}$, $V_{023}$, $V_{033}$, and $V_{043}$ set at the step 40 are set to be higher than the data values $V_{014}$, $V_{024}$, $V_{034}$, and $V_{044}$ set at the step 41, respectively.

In the operation of the HOT mode, the CPU determines whether or not the difference $\Delta V$ is greater than the predetermined value Va as in the case of the operation of the COLD mode, at a step 42. If $\Delta V \geq V_a$, the vehicle is accelerating, and the CPU determines whether or not the vacuum $P_B$ is smaller than a predetermined pressure Pa ($-150$ mmHg, for example) at a step 43. If the vacuum $P_B$ is greater than the predetermined pressure Pa ($P_B>$Pa), it means that the vehicle is accelerating rapidly, and the timer $T_0$, of 2 seconds for example, is set at a step 44. Then data values $V_{015}$, $V_{025}$, $V_{035}$, and $V_{045}$ are in turn set at a step 45, as the reference vehicle speed values $V_{01}$ through $V_{04}$. On the other hand, if $P_B \leq$ Pa, the vehicle is accelerating gradually, and the CPU determines whether or not the count value of the timer $T_0$ is equal to zero ($T_0 = 0$), that is, whether or not 2 seconds have lapsed after the transition from the rapid accelerating condition to the slow acceleration condition, at a step 46. If $T_0 \neq 0$, there is a possibility that the rapid acceleration is still occurring, and the program goes to the step 45. On the other hand, if $T_0 = 0$, data values $V_{016}$, $V_{026}$, $V_{036}$, and $V_{046}$ are in turn set a step 47, as the reference vehicle speed values $V_{01}$ through $V_{04}$. In addition, the data values $V_{015}$, $V_{025}$, $V_{035}$, and $V_{045}$ set at the step 45 are set to be higher than the data values $V_{016}$, $V_{026}$, $V_{036}$, and $V_{046}$ set at the step 47, respectively.

If it is detected that the difference $\Delta V$ is smaller than the value Va ($\Delta V <$ Va) at the step 42, then the CPU determines whether or not the absolute value $|\Delta V|$ is equal to or smaller than the value Va ($|\Delta V| \leq$ Va) at a step 48. If $|\Delta V|$ Va, the vehicle is cruising, and the CPU determines whether or not the vacuum $P_B$ is greater than the predetermined value Pa ($-150$ mmHg) is detected at a step 49. If the vacuum $P_B$ is greater than the predetermined value ($P_B >$ Pa), the timer $T_0$ is set at 2 seconds, for example, at step 50. Subsequently, data values $V_{017}$, $V_{027}$, $V_{037}$, and $V_{047}$ are in turn set at a step 51, as the reference vehicle speed values $V_{01}$ through $V_{04}$. On the other hand, if $P_B \leq$ Pa, the CPU determines whether or not the count value of the timer $T_0$ is equal to zero ($T_0 = 0$), at a step 52. If $T_0 \neq 0$, the program goes to the step 51. On the other hand, if $T_0 = 0$, data values $V_{018}$, $V_{028}$, $V_{038}$, and $V_{048}$ are in turn set at a step 53, as the reference vehicle speed values $V_{01}$ through $V_{04}$. In addition, the data values $V_{017}$, $V_{027}$, $V_{037}$, and $V_{047}$ set at the step 51 are set to be higher than the data values $V_{018}$, $V_{028}$, $V_{038}$, and $V_{048}$ set at the step 53, respectively.

Through the above described steps for determining the reference vehicle speed values $V_{01}$ through $V_{04}$, the reference vehicle speed values $V_{01}$ through $V_{04}$ for the COLD mode ($T_W <$ Ta) are set to be higher than the reference vehicle speed values $V_{01}$ through $V_{04}$ for the HOT mode ($T_W \geq$ Ta). Further, if the cooling water temperature $T_W$ is lower than the second reference engine temperature Tb which is set to be lower than the first reference engine temperature Ta in the COLD mode, the reference vehicle speed values $V_{01}$ through $V_{04}$ are set to be still higher.

Figure 2C:
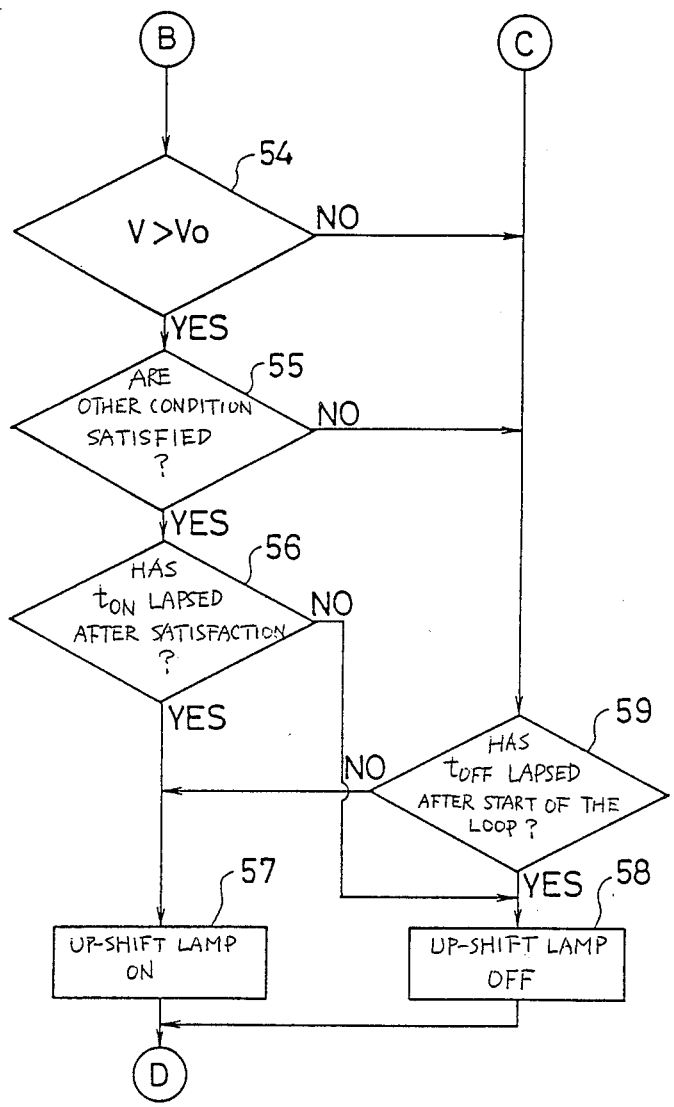

After determining the reference vehicle speed values $V_{01}$ through $V_{04}$ for each gear position (1st gear through 4th gear), the CPU determines whether or not the vehicle speed V in each gear position is higher than the reference vehicle speed value $V_0$ ($V_{01}$ through $V_{04}$) at a step 54, as depicted in FIG. 2C. If the vehicle speed V is higher then the reference vehicle speed value $V_0$, the CPU determines whether or not other conditions for the up-shift operation are satisfied at a step 55. If the other conditions are satisfied, the vehicle is operating under a condition in which the up-shift operation of the transmission gear is required, and the CPU determines whether or not a predetermined time period $t_{ON}$ has lapsed after the conditions have been satisfied at a step 56. If the predetermined time period $t_{ON}$ has lapsed, a drive command is supplied to the drive circuit 14, to turn on the up-shift indication lamp 13, at a step 57. If the predetermined time period $t_{ON}$ has not lapsed, a lamp drive stop command is supplied to the drive circuit 14, to turn off the up-shift indication lamp 13. This means that the up-shift indication lamp 13 will not be turn-on if the conditions for the up-shift operation become satisfied within the predetermined time period $t_{ON}$ after the satisfaction of the conditions.

On the other hand, the program goes to a step 59 to detect whether or not a predetermined time period $t_{OFF}$ has lapsed after the program entered the loop, when the gear position is detected to be other than the first through fourth gears, i.e. the transmission gear is at the neutral position or the fifth gear, at the steps 25 through 28, under conditions such as when the absolute value $|\Delta V|$ is larger than the predetermined value Va $|\Delta V| >$ Va), i.e. when the vehicle is decelerating, at the step 38 or 48; when the vehicle speed V is detected to be equal to or smaller than the predetermined vehicle speed value $V_0$ ($V \leq V_0$) at the step 54; or when it is detected that the other conditions for the up-shift operation are not all satisfied, at the step 55. If the predetermined time period $t_{OFF}$ has lapsed, the program goes to the step 58, to stop the driving of the up-shift indication lamp 13. If the predetermined time period $t_{OFF}$ has not lapsed, the program goes to the step 57, continuing to drive the up-shift indication lamp 13.

If the predetermined time period $t_{OFF}$ is set to be shorter than the predetermined time period $t_{ON}$, the frequency of the driving of the up-shift indication lamp 13 will be reduced. However, the reduced time periods in which the up-shift indication will otherwise take place are not time periods the most appropriate for the up-shift operation. Therefore, in the above case, the stopping of the driving of the up-shift indication lamp 13 has an effect to enforce a driving manner by which the transmission gear is up-shifted always at an optimum time.

It will be appreciated from the foregoing, from the above described embodiment of the indication method according to the present invention, the up-shift point which functions as a reference of the indication of the up-shift operation of a manual transmission gear is changed to a high speed side when the temperature of the engine is lower than a reference engine temperature value for detecting a low temperature range, which is set to be lower than an engine temperature value for detecting a medium temperature range. Thus, a sufficient driveability of the engine is assured also in a low temperature range, and the warming-up characteristic is improved (the warm-up time is reduced).

Figure 3:
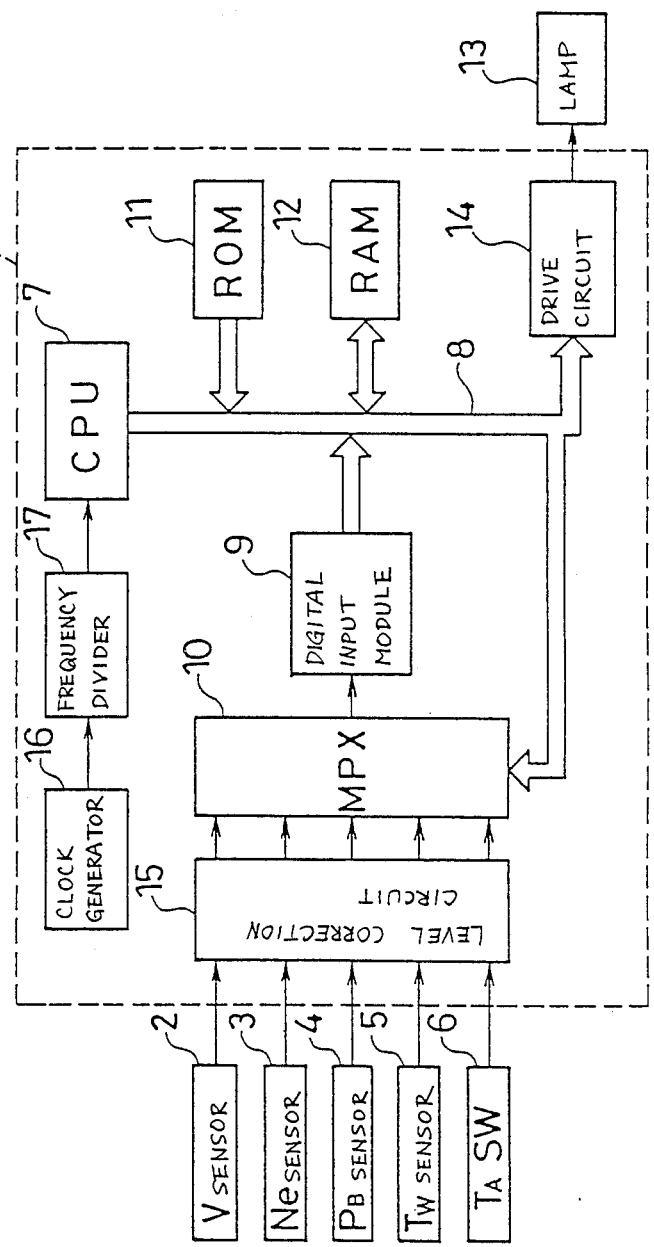
FIG. 3 is a block diagram showing another example of the control system in which a second embodiment of the indication method according to the present invention is adopted.
Figure 4A:
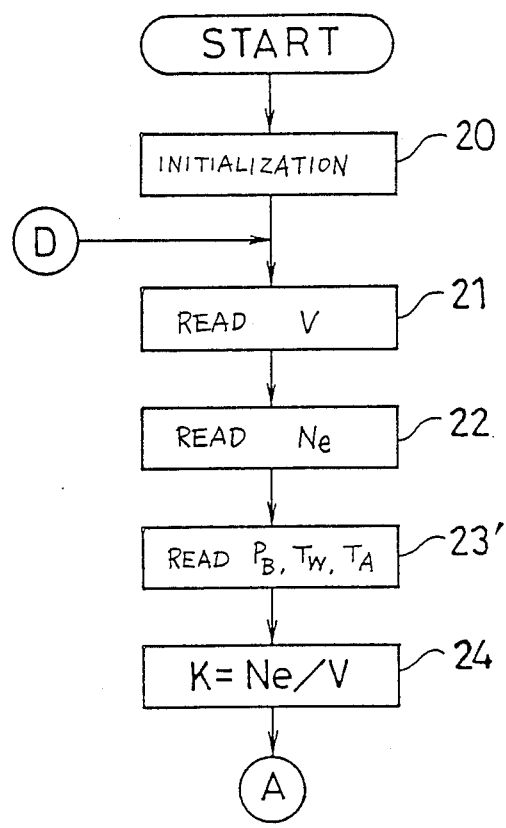
FIGS. 4A, 4B(a), and 4B(b) are flowcharts illustrating steps of the second embodiment of the indication method in which the jump point A of FIG. 4A connects to the point A of FIG. 4B(a), the jump point B of FIG. 4B(a) and the jump point C of FIG. 4B(b) connect to points B and C of FIG. 2C, and the point D of FIG. 4A originals from the jump point D of FIG. 2C.
Figure 4B:
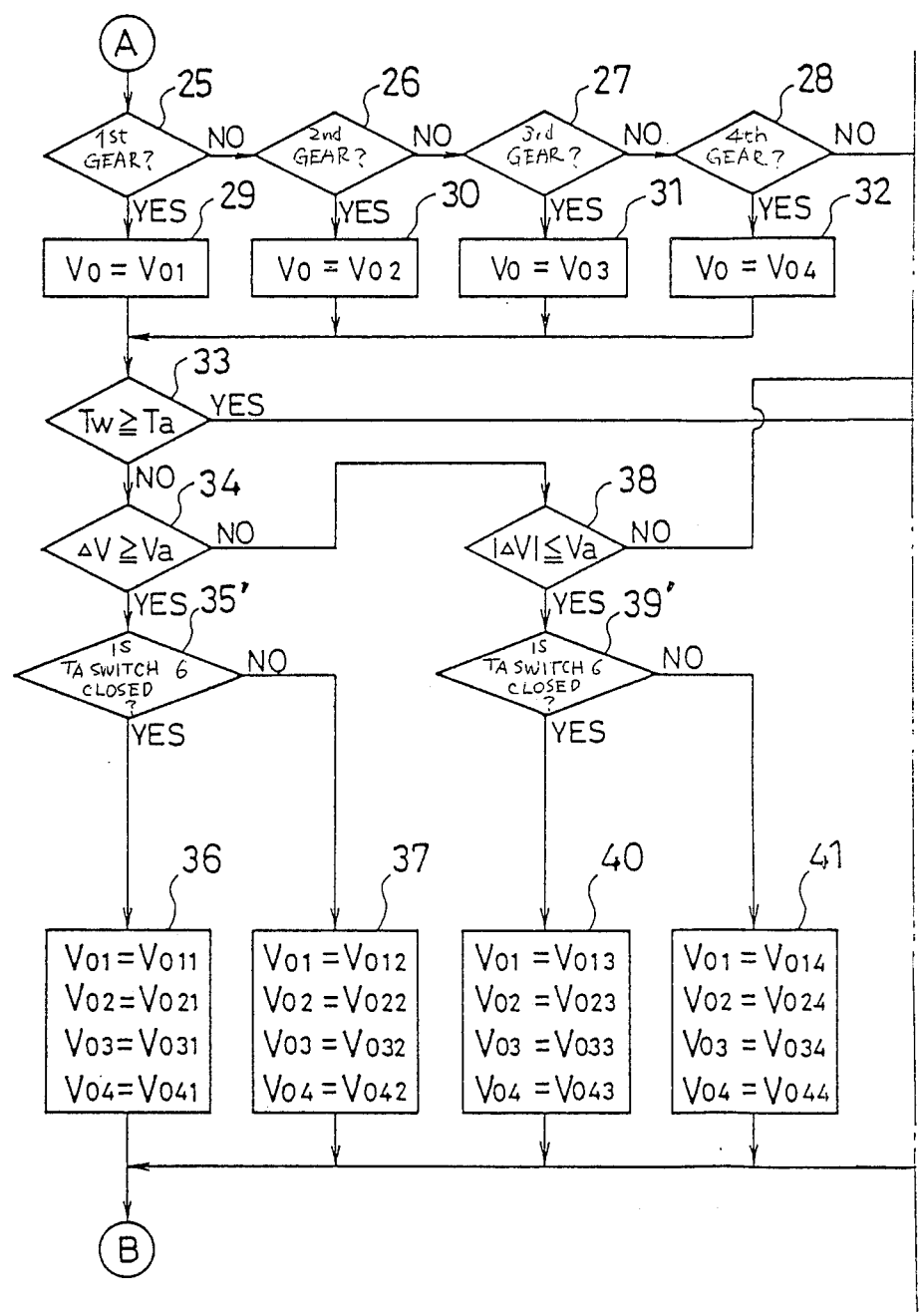
Figure 4B:
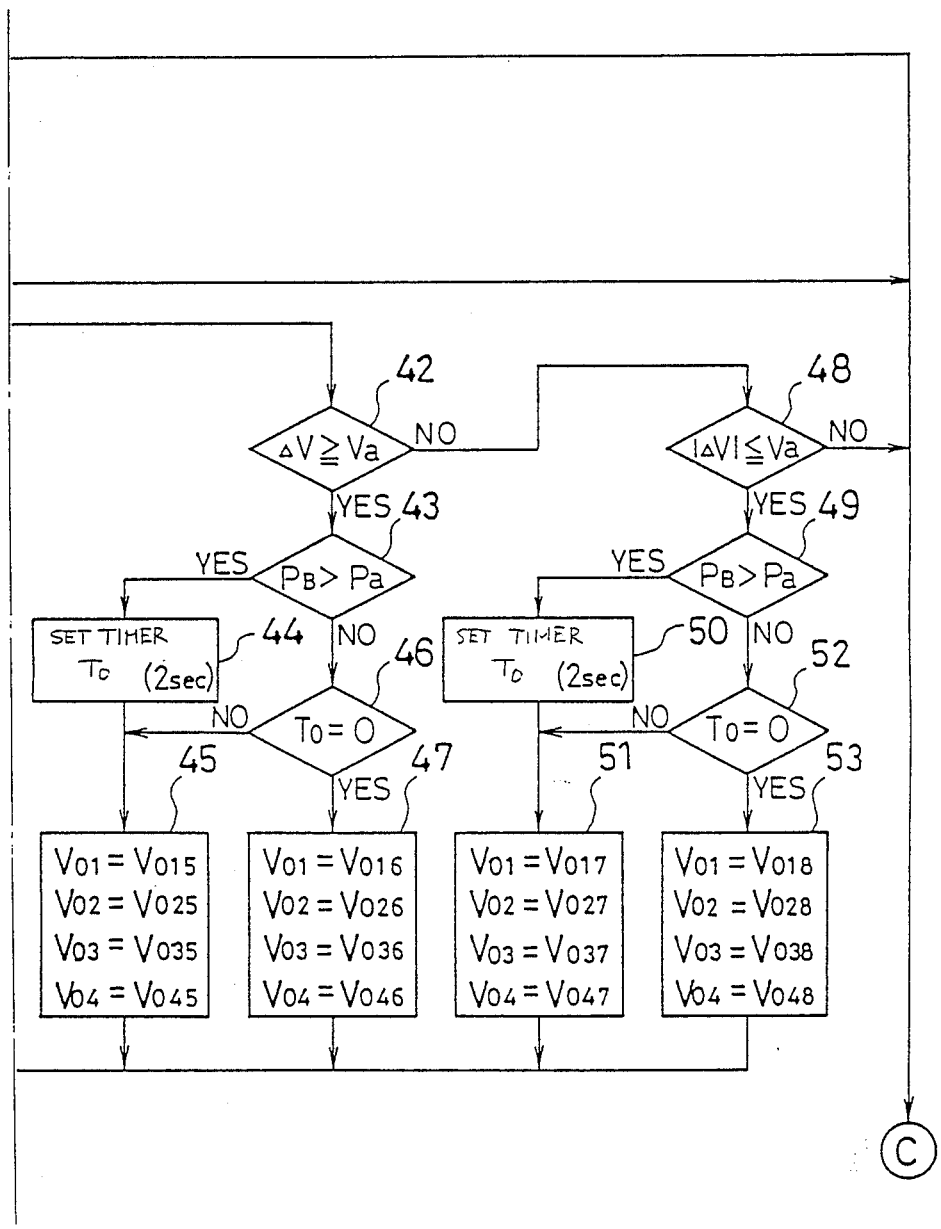

Referring to FIGS. 3 through 4B(a) and 4B(b), a second embodiment of the present invention will be explained below.

FIG. 3 is a block diagram of a control system similar to the system shown in FIG. 1. In addition to the sensors 2 through 5 of the circuit of FIG. 1, an intake air temperature switch 6 for detecting the temperature of the intake air in the intake pipe of the engine is connected to the control circuit shown in this figure, which is generally designated at 1'. Since the other portions of the control system are the same as those of the control system shown in FIG. 1, the explanation thereof will not be repeated. The intake air temperature switch 6 turns on (closes) when the temperature $T_A$ in the intake pipe becomes lower than a reference intake air temperature Tb' (of 15° C, for example). An output signal from the intake air temperature switch 6 ($T_A$ switch) is supplied to the MPX 10 which selectively supplies one of the output signals from the sensors 2 through 5 and the intake air temperature switch 6 which are supplied from the level correction circuit 15, to the digital input module 9 in accordance with the command from the CPU 7.

With this construction, the control circuit 1' performs a control operation in which the operational state of the vehicle is determined from the output signals from the sensors 2-5 and the switch 6, and the necessity of the up-shift operation of the manual transmission is indicated to a driver of the vehicle, by driving the lamp 13, in accordance with a program which will be described below.

FIG. 4A shows a part of the steps of the up-shift indication operation performed by the control circuit 1' which is the same as the part shown in FIG. 2A except that the flowchart includes a step 23' instead of the step 23 in FIG. 2A. At the step 23', the analog output signals from the $P_B$ sensor 4, and the $T_W$ sensor 5 and the on/off output signal from the $T_A$ switch 6 are read at intervals (400 m sec, for example) which are longer than the interval of the starting of the program.

Turning to FIGS. 4B(a) and 4B(b), steps of the second embodiment of the present invention will be further explained. In FIG. 4B(a), as in the previous case, the CPU determines whether or not the engine cooling water temperature $T_W$ is equal to or higher than the predetermined reference temperature Ta (75° C, for example) at the step 33. If $T_W <$ Ta, the COLD mode operation will be executed. In the COLD mode ($T_W <$ Ta), the difference $\Delta V$ of the present value of the vehicle speed and the preceding value of the vehicle speed is compared with the predetermined value Va (0.5 mile/h) at the step 34. If $\Delta V \geq$ Va, the vehicle is accelerating, and the CPU determines whether or not the $T_A$ switch is closed, i.e. whether or not the intake air temperature $T_A$ is below the reference intake air temperature Tb' (15° C), at a step 35'. If the $T_A$ switch is closed, the data values $V_{011}$, $V_{021}$, $V_{031}$, and $V_{041}$ are in turn set at the step 36, as the reference vehicle speed values $V_{01}$ through $V_{04}$. On the other hand, if the $T_A$ switch 6 is open, the data values $V_{012}$, $V_{022}$, $V_{032}$, and $V_{042}$ are set at the step 37, as the reference vehicle speed values $V_{01}$ through $V_{04}$.

On the other hand, if it is detected that $\Delta V$ is smaller than the predetermined value Va ($\Delta V <$ Va) at the step 34, the CPU determines whether or not an absolute value $|\Delta V|$ is equal to or smaller than the predetermined value Va, at the step 38 as in the case of the previous embodiment. If $|\Delta V| \leq$ Va, the vehicle is cruising, and the CPU determines whether or not the $T_A$ switch 6 is closed is at a step 39'. If the $T_A$ switch 6 is closed, the data values $V_{013}$, $V_{023}$, $V_{033}$, and $V_{043}$ are in turn set at the step 40, as the reference vehicle speed values $V_{01}$ through $V_{04}$. On the other hand, if the $T_A$ switch 6 is open, the data values $V_{014}$, $V_{024}$, $V_{034}$, and $V_{044}$ are set at the step 41, as the reference vehicle speed values $V_{01}$ through $V_{04}$.

Since the steps of the HOT mode operation in this embodiment are the same as the steps of the previous embodiment, its explanation will not be repeated.

It will be appreciated from the foregoing, in the case of the second embodiment of the indication method according to the present invention, the up-shift point which functions as a reference of the indication of the up-shift operation for a manual transmission gear is changed to a high speed side when the intake air temperature is lower than a reference intake air temperature value, which is set to be lower than a reference engine temperature value. Thus, a sufficient driveability of the engine is also assured in a low temperature range, and the warming-up characteristic is improved (the warm-up time is reduced).

Moreover, the present invention generally relates to a method in which the reference vehicle speed value is changed when the temperature of the engine is low. As regards to the change of the reference vehicle speed value when the temperature of the engine is medium or high, there is a Japanese patent application No. 58-134184 of the present applicant. In the method disclosed in this patent application, the discrimination is performed on the basis of the temperature of the engine detected from the cooling water temperature $T_W$ for example, or an ambient temperature, such as the intake air temperature $T_A$.

Above, the indication method according to the present invention has been described by way of example in which the necessity of the up-shifting for a manual transmission gear is indicated. However, it is to be noted that the indication method of the down-shift operation can also be established in the similar manner.

Further, in the case of the second embodiment, the intake air temperature is a parameter which represents the atomization of the fuel relatively accurately. Therefore, the driveability of the vehicle is secured satisfactorily.

What is claimed is:

1. A method for indicating a shift operation for a manual transmission gear in a vehicle having an engine, comprising the steps of:
    (a) detecting a vehicle speed and a temperature of the engine mounted on the vehicle;
    (b) determining a reference vehicle speed, said reference vehicle speed being set at a first value which is higher than a second value, said second value corresponding to a condition where the detected temperature of the engine is higher than a first reference engine temperature, said first value being set when the detected temperature of the engine is lower than said first reference engine temperature;
    (c) indicating the shift operation in response to a comparison between the detected vehicle speed and said reference vehicle speed;
    (d) comparing a detected engine temperature with a second reference engine temperature, said second reference engine temperature being lower than said first reference engine temperature; and
    (e) raising said reference vehicle speed when the detected engine temperature is lower than said second reference engine temperature.

2. A method for indicating a shift operation for a manual transmission gear in a vehicle having an engine, comprising the steps of:
    (a) detecting a vehicle speed and a temperature of the engine mounted on the vehicle;
    (b) determining a reference vehicle speed 1 said reference vehicle speed being set at a first value which is higher than a second value, said second value corresponding to a condition where the detected temperature of the engine is higher than a first reference engine temperature, said first value being set when the detected temperature of the engine is lower than said first reference engine temperature;

(c) indicating the shift operation in response to a comparison between the detected vehicle speed and said reference vehicle speed;
(d) detecting an intake air temperature of the engine;
(e) comparing the detected intake air temperature of the engine with a reference intake air temperature, said reference intake air temperature being set a value lower than the first reference engine temperature; and
(f) raising the reference vehicle speed when the detected intake air temperature of the engine is lower than said reference intake air temperature.

* * * * *